United States Patent [19]
Kanno et al.

[11] Patent Number: 5,599,087
[45] Date of Patent: Feb. 4, 1997

[54] CORNER OR END POSITION INDICATING APPARATUS FOR A VEHICLE

[75] Inventors: Yasunori Kanno, Yokohama; Yoshiaki Fukatsu, Nagoya; Shunichi Ogawa, Toyota, all of Japan

[73] Assignee: Nippondenso Co., Ltd., Kariya-City, Japan

[21] Appl. No.: 276,328

[22] Filed: Jul. 18, 1994

[30] Foreign Application Priority Data

Jul. 19, 1993 [JP] Japan .................................. 5-178203

[51] Int. Cl.$^6$ ...................................................... B60Q 1/32
[52] U.S. Cl. .......................... 362/82; 362/83; 362/83.3; 340/468
[58] Field of Search ..................................... 340/469, 479, 340/468; 362/82, 83, 83.3

[56] References Cited

U.S. PATENT DOCUMENTS

| | | | |
|---|---|---|---|
| 2,844,760 | 7/1958 | Rabinow | 340/479 |
| 4,368,505 | 1/1983 | Tomforde | 362/80 |
| 4,722,037 | 1/1988 | Davis | 362/231 |
| 4,734,697 | 3/1988 | Robinson et al. | 340/67 |
| 5,186,533 | 2/1993 | Hori | 340/479 |

FOREIGN PATENT DOCUMENTS

| | | |
|---|---|---|
| 58-46377 | 3/1983 | Japan . |
| 63-164037 | 10/1988 | Japan . |
| 3109925 | 11/1991 | Japan . |
| 4270981 | 9/1992 | Japan . |

Primary Examiner—Georgia Y. Epps
Assistant Examiner—Thomas Robbins
Attorney, Agent, or Firm—Cushman Darby & Cushman IP Group of Pillsbury Madison & Sutro LLP

[57] ABSTRACT

A corner or end position indicating apparatus for an automotive vehicle comprises a light source 6 emitting light, and first and second marker point indicators 2 and 3. The first marker point indicator 2, displayed red, is larger and brighter than the second marker point indicator 3 displayed blue. A first optical path is defined between the first marker point indicator 2 and the light source 6, and a second optical path is defined between the second marker point indicator 3 and the light source 6. The first optical path is longer than the second optical path. A concave mirror 5 alters a direction of the light emitted from the light source 5 upward a rear window glass R of the automotive vehicle. The first marker point indicator 2, the light source 6 and the concave mirror 5 are cooperative to form an image 2a of the first marker point indicator 2 at a position corresponding to a corner or end position of a vehicle body. Meanwhile, the second marker point indicator 3, the light source 6 and the concave mirror 5 are cooperative to form an image 3a of the second marker point indicator 3 at a position far from the corner or end position of the vehicle body.

9 Claims, 6 Drawing Sheets

CORNER OR END POSITION INDICATING APPARATUS FOR A VEHICLE

BACKGROUND OF THE INVENTION

1. Field of the Invention

The present invention relates to a corner or end position indicating apparatus for a vehicle, by which a virtual image of a marker is formed at a position corresponding to the corner or end position of a vehicle body, thereby enabling a driver sitting in a passenger compartment room of the vehicle to easily perceive or grasp the position of the corner or end position of the vehicle body and thus increasing the visibility of the portions difficult to see.

2. Prior Art

Unexamined Japanese Utility Model Application No. HEI 3-109925/1991 shows one conventional corner or end position indicating apparatus, wherein a plurality of marker point indicators are disposed and an optical display means displays these indicators.

However, this conventional indicating apparatus utilizes a lens in its optical system to enlarge the images of the marker point indicators. Therefore, the farther the image is formed from a driver's eye the larger and brighter the image is displayed. Thus, it provides a reversed scenographic view in which the far-and-near relation of images is opposite to that of a normal view seen by the driver.

SUMMARY OF THE INVENTION

Accordingly, in view of above-described problems encountered in the prior art, a principal object of the present invention is to provide a corner or end position indicating apparatus capable of providing a natural scenographic and three-dimensional view of the images of the plurality of marker point indicators.

In order to accomplish this and other related objects, a first aspect of the present invention provides a corner or end position indicating apparatus for a vehicle comprising: a plurality of marker point indicators for indicating a corner or end point of a vehicle body, the plurality of marker point indicators including first and second marker point indicators, the first marker point indicator being larger than the second marker point indicator; an optical element associated with the first and second marker point indicators for displaying images of the first and second marker point indicators; and a first optical path defined between the first marker point indicator and the optical element and a second optical path defined between the second marker point indicator and the optical element, the first optical path being shorter than the second optical path.

A second aspect of the present invention provides a corner or end position indicating apparatus for a vehicle comprising: a light source emitting light; a plurality of marker point indicators for indicating a corner or end point of a vehicle body, the plurality of marker point indicators including first and second marker point indicators, the first marker point indicator being larger than the second marker point indicator; a first optical path defined between the first marker point indicator and the light source and a second optical path defined between the second marker point indicator and the light source, the first optical path being longer than the second optical path; and a deflecting element altering a direction of the light emitted from the light source.

A third aspect of the present invention provides a corner or end position indicating apparatus for a vehicle comprising:

a light source emitting light; a plurality of marker point indicators including first and second marker point indicators, the first marker point indicator being larger than the second marker point indicator; a first optical path defined between the first marker point indicator and the light source and a second optical path defined between the second marker point indicator and the light source, the first optical path being longer than the second optical path; a deflecting element altering a direction of the light emitted from the light source; the first marker point indicator, the light source and the deflecting element being cooperative to form an image of the first marker point indicator at a position corresponding to a corner or end position of a vehicle body; and the second marker point indicator, the light source and the deflecting element being cooperative to form an image of the second marker point indicator at a position far from the corner or end position of the vehicle body.

A fourth aspect of the present invention provides a corner or end position indicating apparatus for a vehicle comprising: a plurality of marker point indicators indicating a corner or end point of a vehicle body, the plurality of mark point indicators including first and second marker point indicators, the first marker point indicator being larger than the second marker point indicator; an optical element having an enlargement function for forming enlarged images of the marker point indicators at portions corresponding to the corner or end point of the vehicle body; a first optical path defined between the first marker point indicator and the optical element and a second optical path defined between the second marker point indicator and the optical element, the first optical path being shorter than the second optical path; and an image of the first marker point indicator being brighter than that of the second marker point indicator.

Furthermore, in a preferable mode of the present invention, the first and second marker point indicators are interposed between the light source and the deflecting element. An image of the first marker point indicator is brighter than that of the second marker point indicator. Light transmissivity of the first marker point indicator is set larger than that of the second marker point indicator. The images of the first and second marker point indicators are displayed with different colors. A color filter is interposed between the deflecting element and the first and second marker point indicators, the color filter consisting of a plurality of light transmission portions each transmitting only light of a specific color and confronting one of the plurality of marker point indicators, thereby allowing the images of the first and second marker point indicators to be displayed with different colors.

The light source, the first and second marker point indicators and the deflecting element are contained in a casing. The casing is surrounded by a heat insulating material. The casing is disposed inside or under a rear tray provided at a rear end of a passenger compartment of the vehicle. The casing has an outlet opening, and light emitted from the light source outgoes through the outlet opening and is reflected on an inside surface of a rear window glass of the vehicle. Or the light emitted from the light source and outgoing through the outlet opening is reflected on a reflection-type hologram provided on an inside surface of a rear window glass of the vehicle.

The filter, interposed between the deflecting element and the first and second marker point indicators, is provided with a light shielding portion which restricts the quantity of light entering through the color filter. The color filter has a function equivalent to an infrared ray cutting filter which prevents sun light from entering therethrough. A heat absorbing filter is interposed between the light source and the first and second marker point indicators. The deflecting element is a concave mirror which is equipped with a means for preventing clouding of a surface of the concave mirror. The means for preventing clouding of the surface of the concave mirror is a black coating provided on a reverse surface of the concave mirror, or a black coating provided along a peripheral portion of the concave mirror.

The deflecting element includes a heat absorbing filter having a reverse surface provided with a vapor deposited reflecting film and a front surface provided with a non-reflective coating. Light transmissivity of the first marker point indicator is set larger than that of the second marker point indicator.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
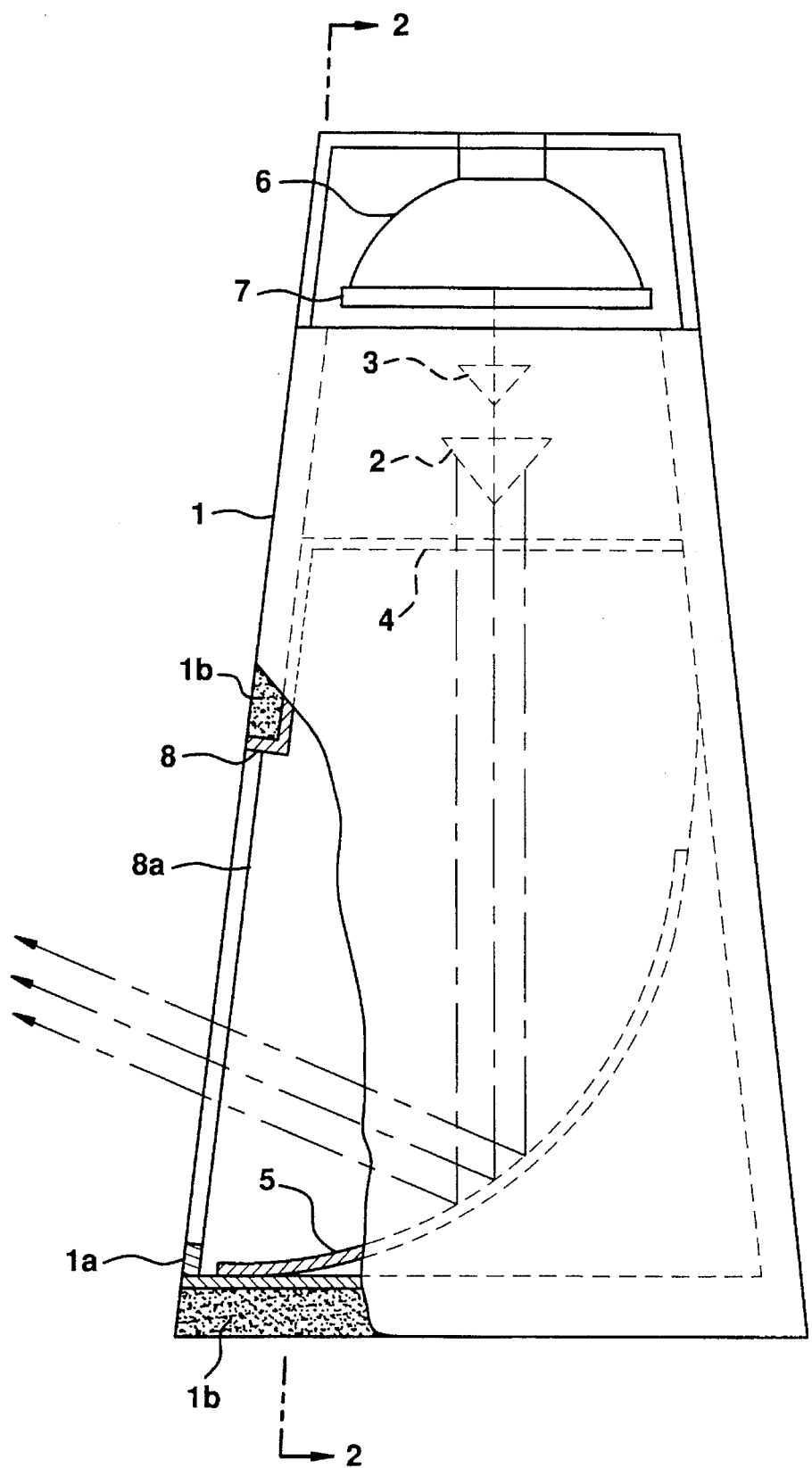
FIG. 1 is a partly cross-sectional side view showing a corner or end position indicating apparatus in accordance with one embodiment of the present invention.
Figure 2:
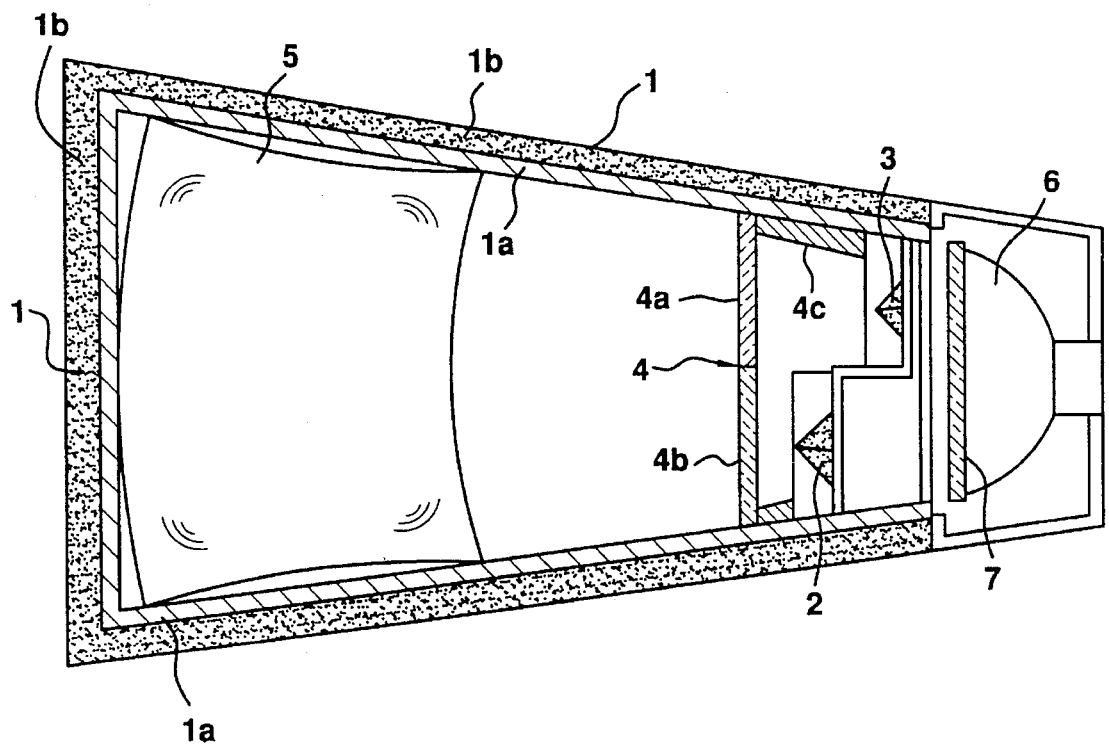
FIG. 2 is a cross-sectional view taken along a line II—II of FIG. 1.

FIG. 1 shows a side view of a corner or end position indicating apparatus in accordance with one embodiment of the present invention, and FIG. 2 is a cross-sectional plan view taken along a line II—II of FIG. 1. A casing 1 of a truncated pyramid box accommodates two marker point indicators 2 and 3 disposed at substantially the same height along a right-and-left (transversal) direction of the casing 1 but are offset with each other in a back-and-forth (longitudinal) direction of the casing 1. A color filter 4 is disposed in front of these marker point indicators 2 and 3. A concave mirror (spherical concave mirror) 5, defined as an optical element, is disposed in front of but spaced from the color filter 4 at the front end of the casing 1. The concave mirror 5 acts as a means for adjusting the size of the displayed images. Furthermore a light source 6, such as a halogen lamp with a reflector, is disposed at the rear end of the casing 1. Light emitted from the light source 6 advances horizontally passing through the marker point indicators 2, 3 and the color filter 4 successively and is reflected upward at the concave mirror 5 and goes out of the casing 1 through an outlet opening 8 provided at the front end of the upper surface of the casing 1, thereby producing marker point indicating or display light. The outlet opening 8 is entirely closed by a transparent cover 8a; thus the inside of the casing 1 is prevented from being contaminated by dust or the like.

The casing 1 comprises a box-like body 1a which has an outer surface wholly surrounded by heat insulating material 1b, so that the inside of the casing 1 is completely separated from the outside of the casing 1 with respect to thermal transfer. The base end of the casing 1 has an opening serving as an inlet opening, with which the front surface of the light source 6 is faced. A heat absorbing filter 7 is attached on the front surface of the light source 6. The heat absorbing filter 7 absorbs heat emitted from the light source 6 and the light source 6 itself is located outside the box-like body 1a in an opened condition; therefore almost all of heat emitted from the light source 6 cannot enter the inside of the casing 1.

Of the two marker point indicators 2 and 3, the marker point indicator 2 is made larger in size than the other marker point indicator 3. These two marker point indicators 2 and 3 are arrayed in an offset and stepwise relation as shown in the plan view of FIG. 2. Light beams passing through these two marker point indicators 2 and 3 advance in parallel with each other. The large marker point indicator 2 is disposed forward to the small marker point indicator 3. Thus, the large marker point indicator 2 is located closely to the concave mirror 5 compared with the small marker point indicator 3. In other words, an optical path connecting the large marker point indicator 2 and the concave mirror 5 is set shorter than an optical path connecting the small marker point indicator 3 and the concave mirror 5.

Meanwhile, the small marker point indicator 3 is located closely to the light source 6 compared with the large marker point indicator 2. Namely, an optical path connecting the small marker point indicator 3 and the light source 6 is set shorter than an optical path connecting the large marker point indicator 2 and the light source 6.

These marker point indicators 2 and 3 are made of synthetic resin or glass capable of transmitting light and formed into a hollow trigonal pyramid configuration with a granulated surface enhancing light diffusibility. Each surface of the marker point indicators 2 and 3 of trigonal pyramid has light transmissivity and light diffusibility different from those of other surfaces, so that ridgelines of the marker point indicators arise clearly to assure three-dimensional appearance of the trigonal pyramid image, when displayed.

Light transmissivity of the small marker point indicator 3 is set smaller than that of the large marker point indicator 2.

Thus, the image of the small marker point indicator 3 is displayed with brightness darker than that of the large marker point indicator 2. Furthermore, the images of these two marker point indicators 2 and 3 are displayed with different colors; for example, the large marker point indicator 2 is red and the small marker point indicator 3 is blue.

The color filter 4, disposed in front of these two marker point indicators 2 and 3, consists of a red transmission portion 4b confronting the large marker point indicator 2 and a blue transmission portion 4a confronting the small marker point indicator 3. Thus, the red transmission portions 4b allows only the light emitted from the large marker point indicator 2 to pass therethrough, and the blue transmission portions 4a allows only the light emitted from the small marker point indicator 3 to pass therethrough. The color filter 4 itself has a function equivalent to the infrared ray cutting filter which prevents sun light from entering therethrough.

Figure 3:
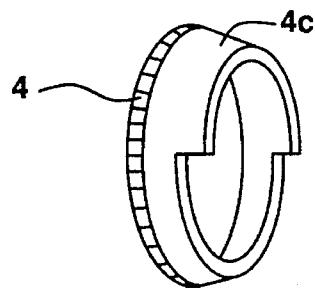
FIG. 3 is a perspective view showing a color filter used in the corner or end position indicating apparatus in accordance with the embodiment of the present invention.

Moreover, as shown in FIG. 3, the color filter 4 is equipped with a light shielding portion 4c which restricts the quantity of light entering from the outside. Thus, the light quality of sun light entering through the color filter 4 is appropriately reduced and the marker point indicators 2 and 3 are surely prevented from being damaged by heat or light.

Figure 4:
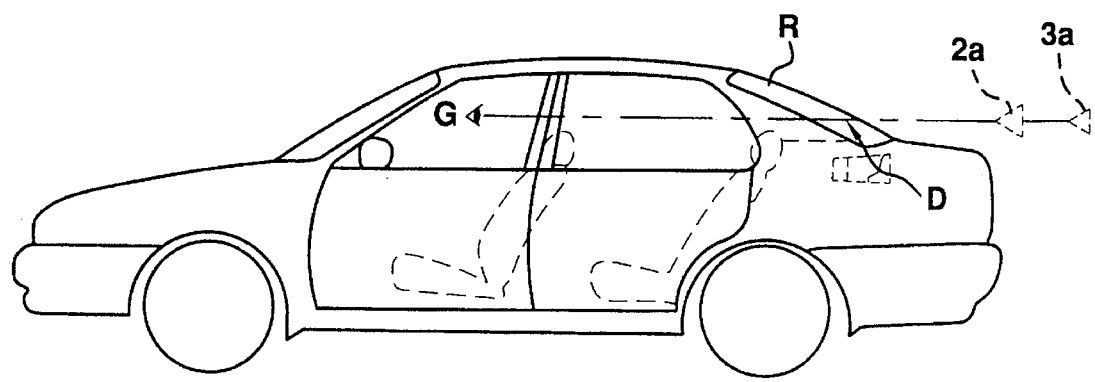
FIG. 4 is a side view illustrating installation position and display condition of the corner or end position indicating apparatus in accordance with the embodiment of the present invention.
Figure 5:
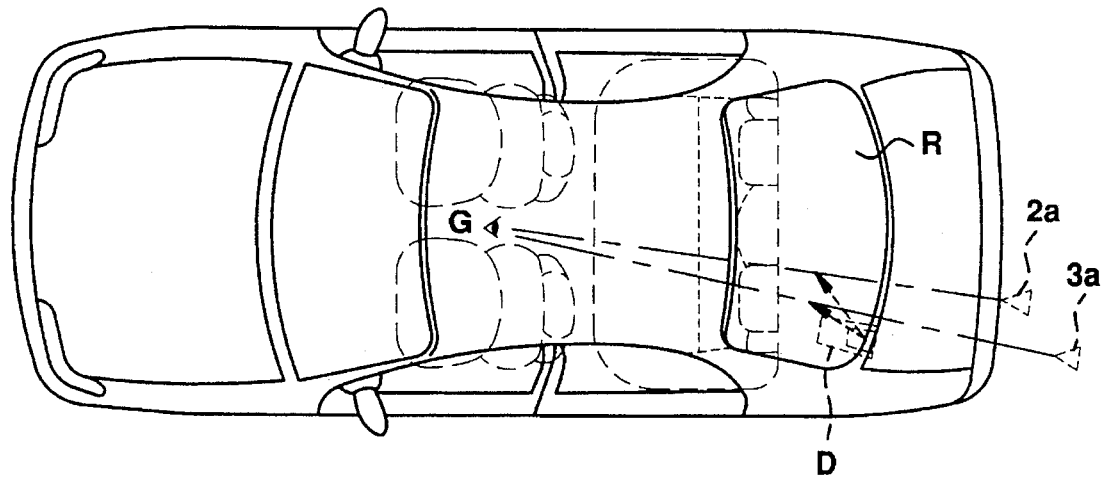
FIG. 5 is a plan view illustrating the installation position and display condition of the corner or end position indicating apparatus in accordance with the embodiment of the present invention.

Thus arranged casing 1 of the corner or end position indicating apparatus D is, for example, disposed inside or under a rear tray provided at the rear end of the passenger compartment of an automotive vehicle as shown in FIGS. 4 and 5. Display light emitted from the outlet opening 8 is reflected on the inside surface of the rear window glass R. Thereafter, the reflected light advances forward and enters an eye G of a driver. To assure such an optical relationship, the corner or end position indicating apparatus D is required to adjust its position and direction. More specifically, as understood from FIGS. 4 and 5, the image 2a of the large marker point indicator 2 is just formed at the rear end of the vehicle body. Meanwhile, the image 3a of the small marker point indicator 3 is formed slightly far from the rear end of the vehicle body.

To facilitate adjustment of position and direction of the casing 1 of the corner or end position indicating apparatus D, the casing 1 is combined with brackets 11, 12 and 13 provided outside the casing 1.

The bracket 11 is a metallic plate bent into a substantially U-shaped configuration, having both side portions extending vertically and a bottom portion extending horizontally to connect these two side portions integrally. Each of vertically extending side portions of the U-shaped bracket 11 is provided with a vertically straightly elongated hole 11a. The bottom portion of the U-shaped bracket 11 is provided with a pair of arc-shaped elongated holes 11b and 11c. (See FIG. 7)

Figure 7:
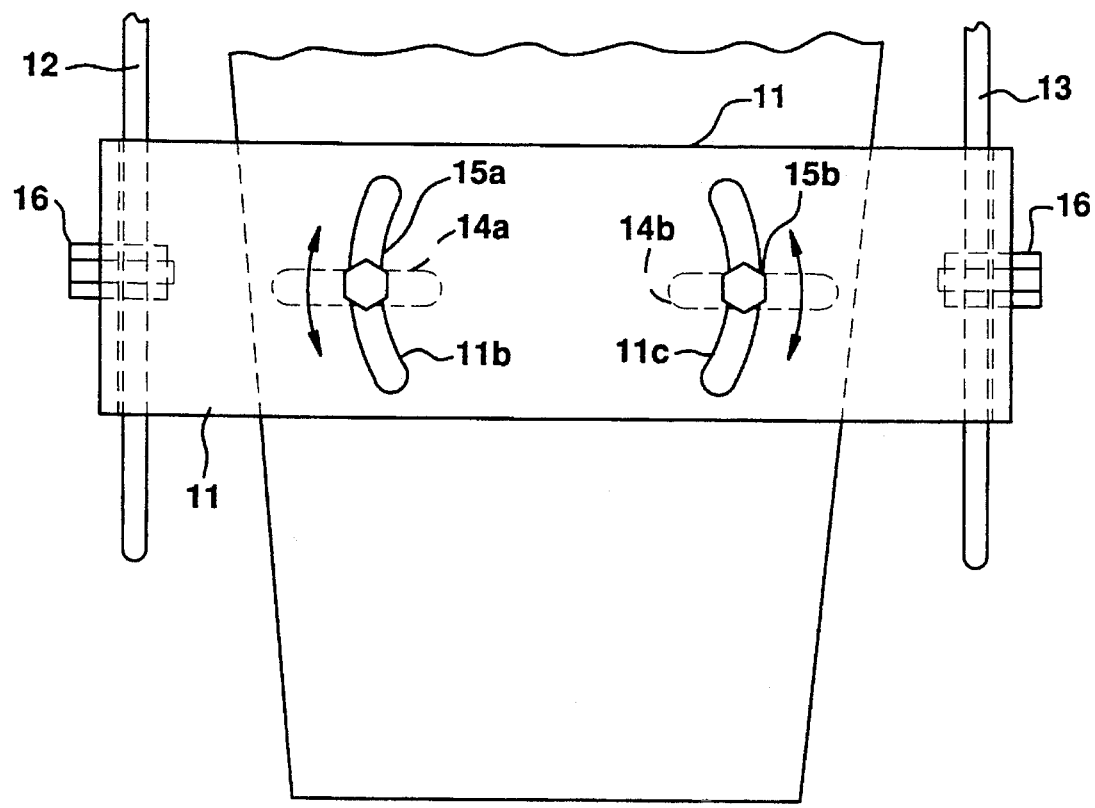
FIG. 7 is a view showing the bottom of one of the brackets.

A plate (not shown) secured on the bottom surface of the casing 1 is provided with two straightly elongated holes 14a and 14b which transversely extend in a line as shown in FIG. 7. A first fixing bolt 15a is inserted into both the arc-shaped elongated hole 11b and the straightly elongated hole 14a to flexibly connecting them, while a second fixing bolt 15b is inserted into both the arc-shaped elongated hole 11c and the straightly elongated hole 14b in the same manner as the first fixing bolt 15a. Thus, the casing 1 is freely adjustable with respect to the bracket 11 to a certain extent on a plane of FIG. 7 so as to cause back-and-forth, right-and-left and rotational movements of the casing 1 with respect to the U-shaped bracket 11, thereby realizing the positional and angular adjustment of the casing 1 of the corner or end position indicating apparatus D.

Another two brackets 12 and 13, each being a metallic plate symmetrically formed into an L-shaped configuration, are provided at both sides of the U-shaped bracket 11. The L-shaped bracket 12 comprises a longitudinally extending portion and a transversely extending portion. The longitudinally extending portion of the L-shaped bracket 12 is provided with a straightly horizontally elongated hole 12a which extends along the longitudinal direction of the casing 1. The transversely extending portion of the L-shaped bracket 12 is provided with two arc-shaped elongated holes 12b, 12b disposed in parallel with each other in the up-and-down direction. Similarly, the L-shaped bracket 13 comprises a longitudinally extending portion and a transversely extending portion. The longitudinally extending portion Of the L-shaped bracket 13 is provided with a straightly horizontally elongated hole 13a (not shown) which extends along the longitudinal direction of the casing 1. The transversely extending portion of the L-shaped bracket 13 is provided with two arc-shaped elongated holes 13b, 13b disposed in parallel with each other in the up-and-down direction.

Figure 6:
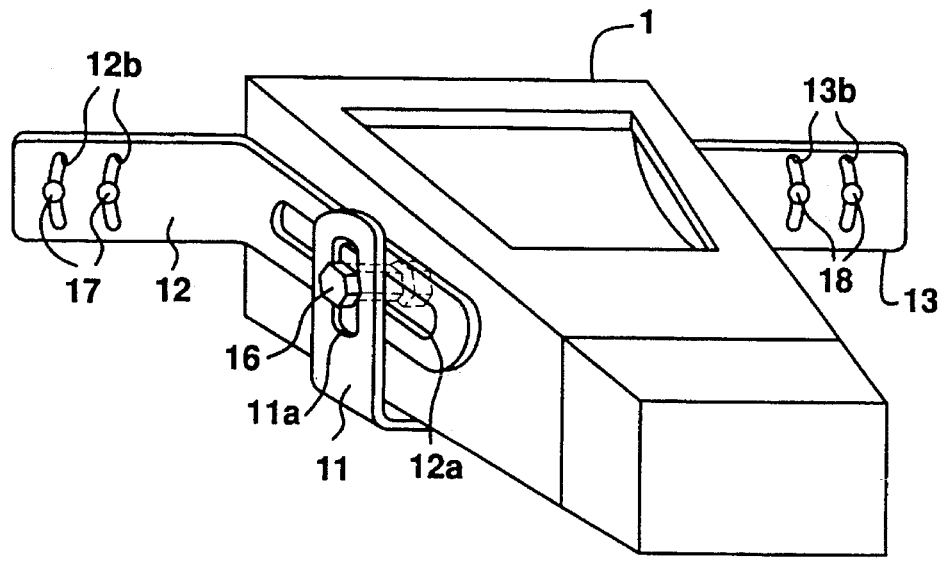
FIG. 6 is a perspective view showing brackets supporting the casing of the corner or end position indicating apparatus in accordance with the embodiment of the present invention.

As shown in FIG. 6, one fixing bolt 16 is inserted into both the vertically straightly elongated hole 11a of the U-shaped bracket 11 and the transversely straightly elongated hole 12a of the L-shaped bracket 12. The other fixing bolt 16 (not shown) is inserted into the vertically straightly elongated hole 11a (not shown) of the U-shaped bracket 11 and the transversely straightly elongated hole 13a (not shown) of the L-shaped bracket 13. Thus, the brackets 12 and 13 are freely adjustable with respect to the bracket 11 to a certain extent so as to cause each of the brackets 12 and 13 to swing in the up-and-down direction and shift in the back-and-forth direction.

Each of the L-shaped brackets 12 and 13 is fixed to the stationary portion, such as a body panel (not shown), through two fixing bolts 17, 17 or 18, 18 which are inserted into the two arc-shaped vertically elongated holes 12b, 12b or 13b, 13b. Thus, the L-shaped brackets 12 and 13 are rotatable within a predetermined angle.

According to such an arrangement of three brackets 11, 12 and 13 constructed as described above, the engagement of the transversely straightly elongated holes 14a, 14b and the fixing bolts 15a, 15b allows the casing 1 of the corner or end position indicating apparatus D to shift in the right-and-left direction, the engagement of the horizontally straightly elongated holes 12a, 13a and the fixing bolts 16, 16 allows the casing 1 of the corner or end position indicating apparatus D to shift in the back-and-forth direction, and the engagement of the vertically straightly elongated holes 11a, 11a and the fixing bolts 16, 16 allows the casing 1 of the corner or end position indicating apparatus D to shift in the up-and-down direction.

Furthermore, the engagement of the arc-shaped elongated holes 11b, 11c and the fixing bolts 15a and 15b allows a rotational movement (i.e. yawing movement) of the casing 1 of the corner or end position indicting apparatus D about a vertical axis of the casing 1. The engagement of the arc-shaped elongated holes 12b, 13b and the fixing bolts 17, 18 allows a rotational movement (i.e. rolling movement) of the casing 1 of the corner or end position indicating apparatus D about a back-and-forth axis of the casing 1. And, the axis of the fixing bolts 16, 16 allows a rotational movement (i.e. pitching movement) of the casing 1 of the corner or end position indicating apparatus D about a right-and-left axis of the casing 1.

Accordingly, by shifting and rotating the casing 1 of the corner or end position indicating apparatus D appropriately so as to adjust the direction and position of an optical axis of the indicating light emitted from the outlet opening 8, the position of an image formed is properly and simply adjusted.

By the way, when the rear window glass R of the automotive vehicle is equipped with wiring of an electric defogger, the reflecting point of the display light on the rear window glass R should be set higher than the lowermost end of the defogger wiring because the rear window is normally distorted largely in the region out of the lowermost end of the wiring of the defogger.

Next, an operation of the corner or end position indicating apparatus thus constructed will be explained hereinafter.

When a driver wants to confirm a distance between the rear end of the vehicle body and a certain obstacle—for example, when the driver moves the automotive vehicle backward, the driver manipulates a display switch (not shown) to turn on the light source 6. The light emitted from the light source 6 passes through the heat absorbing filter 7 and enters into the casing 1. Then, the light passes through two marker point indicators 2, 3 and the color filter 4 successively and reaches the concave mirror 5. After having been reflected at the concave mirror 5, the light further advances upward and goes out of the casing 1 through the outlet opening 8. Subsequently, the light is reflected at the reflecting point on the inside surface of the rear window glass R, thereby forming the solid images 2a and 3a of the marker point indicators 2 and 3 at the portions corresponding to the left rear end of the vehicle body.

As clearly shown in FIGS. 4 and 5, the solid image 2a of the large marker point indicator 2 is displayed at a position closer to the driver's eye G and the solid image 3a of the small marker point indicator 3 is displayed at a position slightly far from the driver's eye G. The solid images 2a and 3a are offset in the right-and-left direction.

If there is a large or enough distance between the rear end of the vehicle body and the obstacle, two solid images 2a and 3a look as if they float in the space near the left rear end of the vehicle body. The driver can see the large solid image 2a displayed closely and brightly, while the small solid image 3a is seen far and dark. Thus, two solid images 2a and 3a can be recognized by the driver as a natural scenographic view.

If the automotive vehicle further moves backward so that the rear end of the vehicle body approaches the obstacle, the far solid image 3a may enter into the obstacle. In such a case, the far solid image 3a overlaps with the obstacle, which creates clear difference between the near solid image 2a and the far solid image 3a in their appearance. Thus, the driver can easily recognize that the rear end position of the vehicle body approaches very closely to the obstacle. Furthermore, since the near solid image 2a is displayed in red, it can surely warn the driver that the distance between the rear end position of the vehicle body and the obstacle is very short when the vehicle approaches the obstacle so closely that the near solid image 2a is overlapped with the obstacle.

If the concave mirror 5 is cooled down too much, the concave mirror 5 may cause dew condensation on the surface thereof due to temperature difference between the concave mirror 5 itself and inside air of the casing 1. Dew condensation normally results in the clouding of the surface of the concave mirror 5. However, the inside space of the casing 1 is thermally isolated due to the existence of the heat insulating material 1b coated around the casing 1. Therefore, it is surely prevented that only the concave mirror 5 is cooled down in a cold atmosphere; thus the concave mirror 5 of this embodiment is completely free from dew condensation and clouding.

As the light source 6 is disposed outside the casing 1, temperature increase of the light source 6 is sufficiently suppressed. In addition, the heat absorbing filter 7 is attached on the front surface of the light source 6; therefore, heat radiation from the light source 5 does not increase the temperature of the inside of the casing 1. Hence, deterioration of the light source 6 itself or marker point indicators 2 and 3 can be surely prevented. Furthermore, as the color filter 4 has function equivalent to the infrared ray cutting filter which prevents sun light from entering therethrough and is equipped with the light shielding portion 4c which restricts the quantity of light entering from the outside, the light quality of sun light entering through the color filter 4 is appropriately reduced and the marker point indicators 2 and 3 are surely prevented from being damaged by heat or light.

Figure 8:
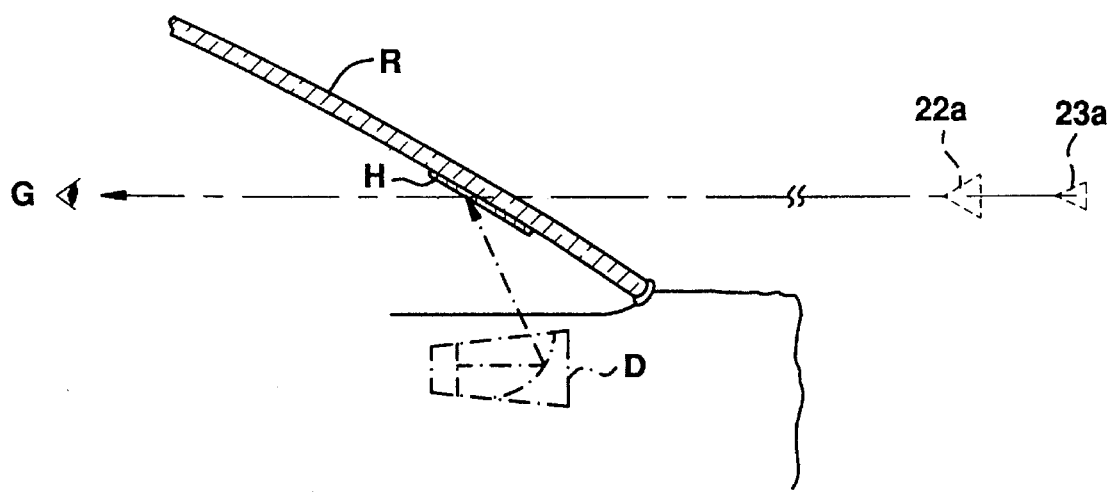
FIG. 8 is a side view showing a hologram attached on the inside surface of the rear window glass and used as a reflecting member of the corner or end position indicating apparatus in accordance with another embodiment of the present invention.

Although the above embodiment utilizes the inside surface of the rear window glass as the reflecting point at which the display light is reflected toward the driver's eye, it is possible to attach or enter a reflection-type hologram H on the inside surface of or in the rear window glass R, as shown in FIG. 8, so that the display light emitted from the corner or end point indicating apparatus D can be reflected or diffracted at the reflection-type hologram H toward the driver's eye G.

A reflection-type hologram preferably used as the reflection-type hologram H of the present invention would be, for example, a reflection-type Lippmann hologram which allows the reference light having a specific wavelength and the objective light to enter into a recording material at a certain incident angle to expose the recording material, then producing an outgoing light having a specific wavelength at a certain outgoing angle. In this case, it will be possible to provide a concave mirror pattern on the hologram H instead of providing the concave mirror 5 inside the casing 1. Namely, the provision of the hologram H allows removing the concave mirror 5 from the casing 1, which realizes the size reduction of the casing 1.

As shown in FIG. 8, the display light emitted from the corner or end position indicating apparatus D enters the hologram H and reaches the driver's eye G after having been reflected or diffracted at the hologram H. The hologram H reflects or diffracts only red and blue display light representing marker point indicators 2 and 3. Thus, it becomes possible to display solid images 22a and 33a brightly and clearly in the vicinity of the rear end position of the vehicle body.

Figure 9:
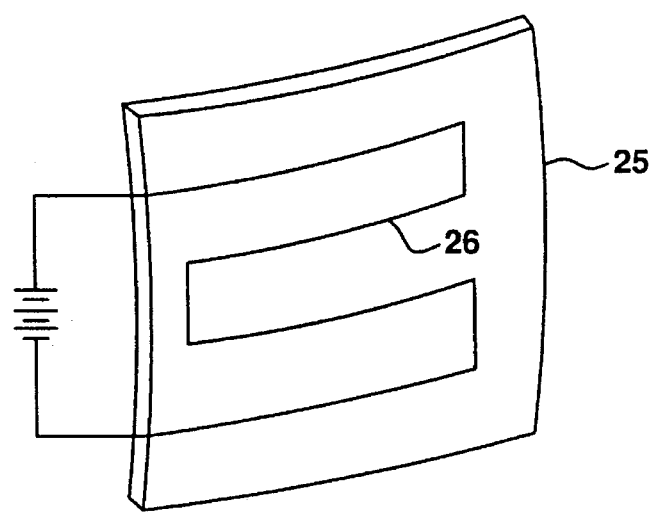
FIG. 9 is a perspective view showing another embodiment of the concave mirror used in the present invention.

FIG. 9 illustrates another embodiment of the concave mirror 5, wherein a concave mirror 25 has a reverse surface attached with a heater wiring 26. Thus, the concave mirror 25 is heated when the heater wiring 26 is supplied with electric power. According to this embodiment, clouding of the concave mirror 25 is surely prevented.

Figure 10A:
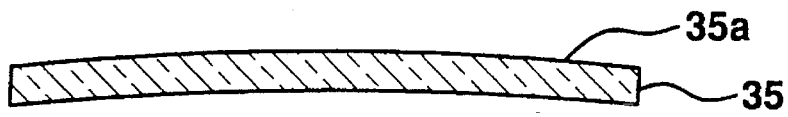
FIGS. 10(A) and 10(B) are cross-sectional views respectively showing still another embodiments of the concave mirror used in the present invention.
Figure 10B:
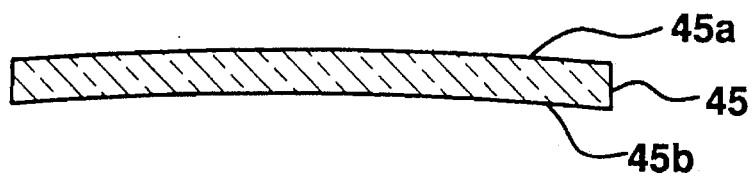

FIGS. 10(A) and 10(B) show still another embodiments of the concave mirror 5. FIG. 10(A) shows a concave mirror (half mirror) 35 having a reverse surface with black coating 35a. FIG. 10(B) shows a concave mirror 45 equipped with a heat absorbing filter having a reverse surface formed with a vapor deposited reflection film 45a and a front surface with a non-reflective coating 45b. According to the concave mirror 35 of FIG. 10(A) embodiment, the black coating 35a absorbs incident light and increases the temperature of the concave mirror 35, thereby preventing the clouding of the concave mirror 35. Similarly, the concave mirror 45 of FIG. 10(B) embodiment can absorb incident light and increase its temperature, thus preventing the clouding of the concave mirror 45.

Figure 11:
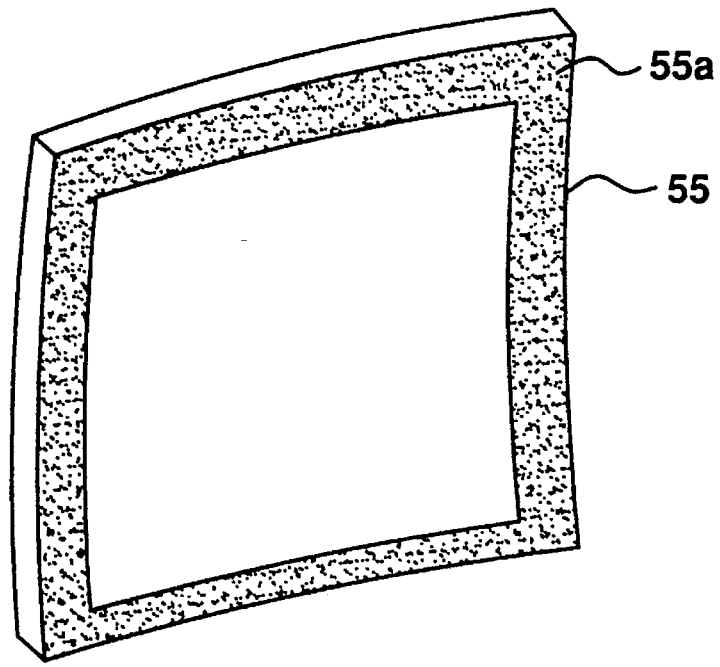
FIG. 11 is a perspective view showing yet another embodiment of the concave mirror used in the present invention.

Yet further, according to FIG. 11 embodiment, a concave mirror 55 has a front surface with a black coating 55a applied only its peripheral portion. This black coating 55a absorbs incident light and increases the temperature of the concave mirror 55.

The concave mirror used in the embodiment of the present invention can be replaced by any convex mirror having enlarging function. The marker point indicator used in the embodiment of the present invention can be replaced by one having a surface reflecting light emitted from the light source or by one having a self-luminous capability.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A corner or end position indicating apparatus for a vehicle comprising:

a light source emitting light;

a plurality of marker point indicators for indicating a corner or end point of a vehicle body, said plurality of marker point indicators including first and second marker point indicators, said first marker point indicator being larger than said second marker point indicator;

a first optical path defined between said first marker point indicator and said light source, and a second optical path defined between said second marker point indicator and said light source, said first optical path being longer than said second optical path; and a deflecting element altering a direction of the light emitted from said light source.

2. A corner or end position indicating apparatus in accordance with claim 1, wherein said first and second marker point indicators are interposed between said light source and said deflecting element.

3. A corner or end position indicating apparatus in accordance with claim 1, wherein an image of said first marker point indicator is brighter than that of the second marker point indicator.

4. A corner or end position indicating apparatus in accordance with claim 3, wherein light transmissivity of said first marker point indicator is set larger than that of said second marker point indicator.

5. A corner or end position indicating apparatus for a vehicle comprising:

a light source emitting light;

a plurality of marker point indicators including first and second marker point indicators, said first marker point indicator being larger than said second marker point indicator;

a first optical path defined between said first marker point indicator and said light source, and a second optical path defined between said second marker point indicator and said light source, said first optical path being longer than said second optical path;

a deflecting element altering a direction of the light emitted from said light source;

said first marker point indicator, said light source and said deflecting element being cooperative to form an image of said first marker point indicator at a position corresponding to a corner or end position of a vehicle body; and said second marker point indicator, said light source and said deflecting element being cooperative to form an image of said second marker point indicator at a position far from the corner or end position of the vehicle body.

6. A corner or end position indicating apparatus in accordance with claim 5, wherein said first and second marker point indicators are interposed between said light source and said deflecting element.

7. A corner or end position indicating apparatus in accordance with claim 5, wherein an image of said first marker point indicator is brighter than that of the second marker point indicator.

8. A corner or end position indicating apparatus in accordance with claim 7, wherein light transmissivity of said first marker point indicator is set larger than that of said second marker point indicator.

9. A corner or end position indicating apparatus in accordance with claim 5, wherein light transmissivity of said first marker point indicator is set larger than that of said second marker point indicator.

* * * * *